United States Patent [19]

Nolan

[11] Patent Number: 5,754,873
[45] Date of Patent: May 19, 1998

[54] METHOD AND APPARATUS FOR SCALING A SELECTED BLOCK OF TEXT TO A PREFERRED ABSOLUTE TEXT HEIGHT AND SCALING THE REMAINDER OF THE TEXT PROPORTIONATELY

[75] Inventor: Joseph C. Nolan, San Jose, Calif.

[73] Assignee: Adobe Systems, Inc., San Jose, Calif.

[21] Appl. No.: 458,058

[22] Filed: Jun. 1, 1995

[51] Int. Cl.[6] ................................................ G06T 3/40
[52] U.S. Cl. ...................... 395/789; 395/805; 395/139; 395/172
[58] Field of Search ........................... 395/139, 144, 395/146, 148, 150, 151, 780, 781, 788, 789, 791, 805, 167, 168, 171, 172; 382/298, 299, 301; 345/127, 128, 129, 130, 132

[56] References Cited

U.S. PATENT DOCUMENTS

| | | | |
|---|---|---|---|
| 5,001,697 | 3/1991 | Torres | 395/139 |
| 5,335,296 | 8/1994 | Larkin et al. | 392/298 |
| 5,341,466 | 8/1994 | Perlin et al. | 395/139 |
| 5,452,697 | 9/1995 | Uehara et al. | 382/317 |

OTHER PUBLICATIONS

Simpson, *Mastering WordPerfect 5.1 & 5.2 for Windows*, SYBEX Inc., 1993, pp. 57, 139, 1032, 1162, 1163.
Microsoft Word, User's Guide, Microsoft Corporation, 1993–1994, pp. 23–25.
Cobb, Gena et al., Word 4 Companion Macintosh, The Cobb Group, Inc. 1989, pp. 285–301.

*Primary Examiner*—Heather R. Herndon
*Assistant Examiner*—Stephen Hong
*Attorney, Agent, or Firm*—Fish & Richardson P.C.

[57] ABSTRACT

The invention relates to a method and apparatus for adjusting the text height within a displayed image. A preferred absolute text height is input to the computer system by a user and is stored. When text images are displayed by the computer system, a selected section of text is determined. The stored preferred absolute text height is then retrieved, and the displayed text images are scaled by a scale factor such that the selected text section is displayed at the preferred absolute text height.

10 Claims, 7 Drawing Sheets

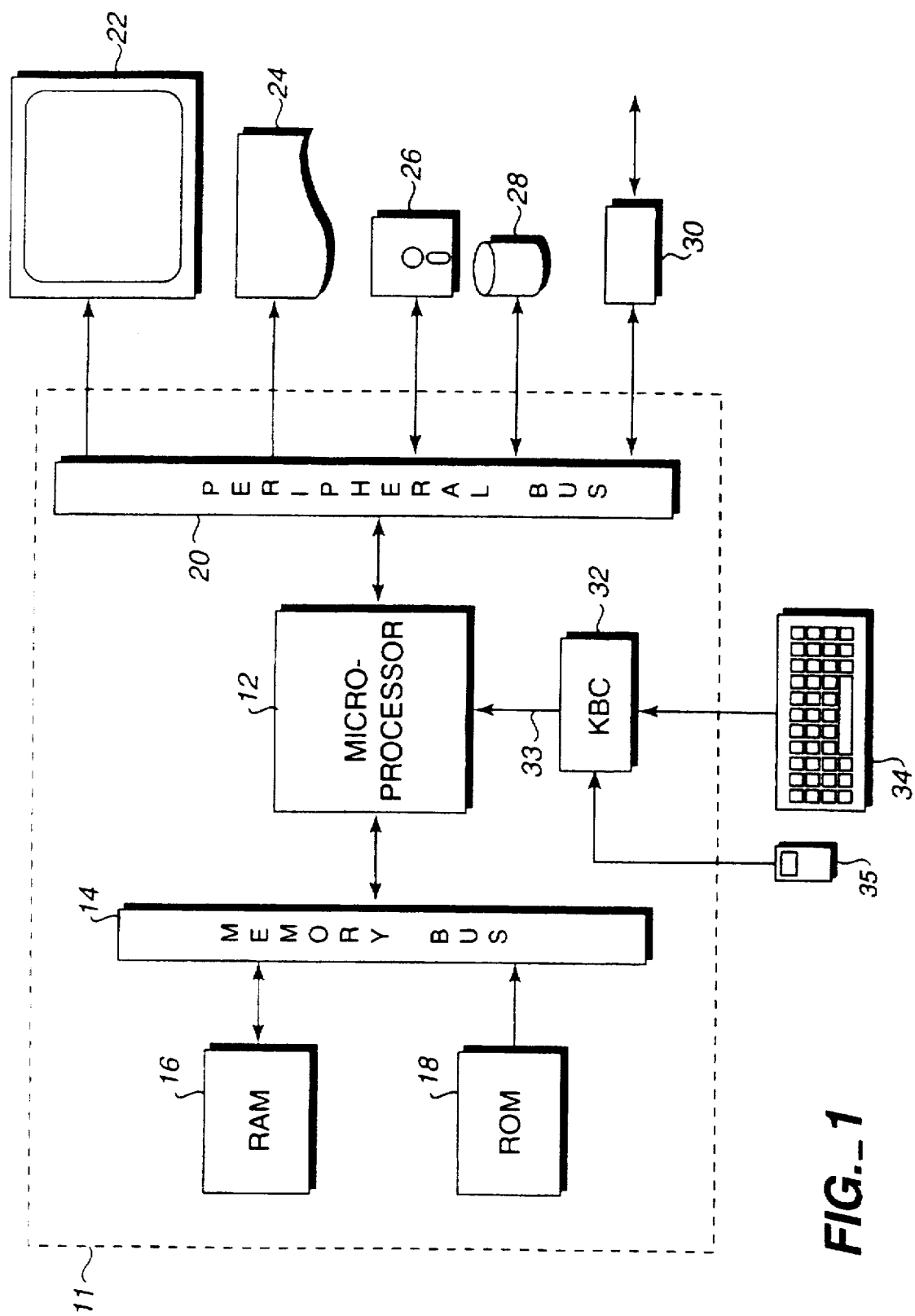
FIG._1

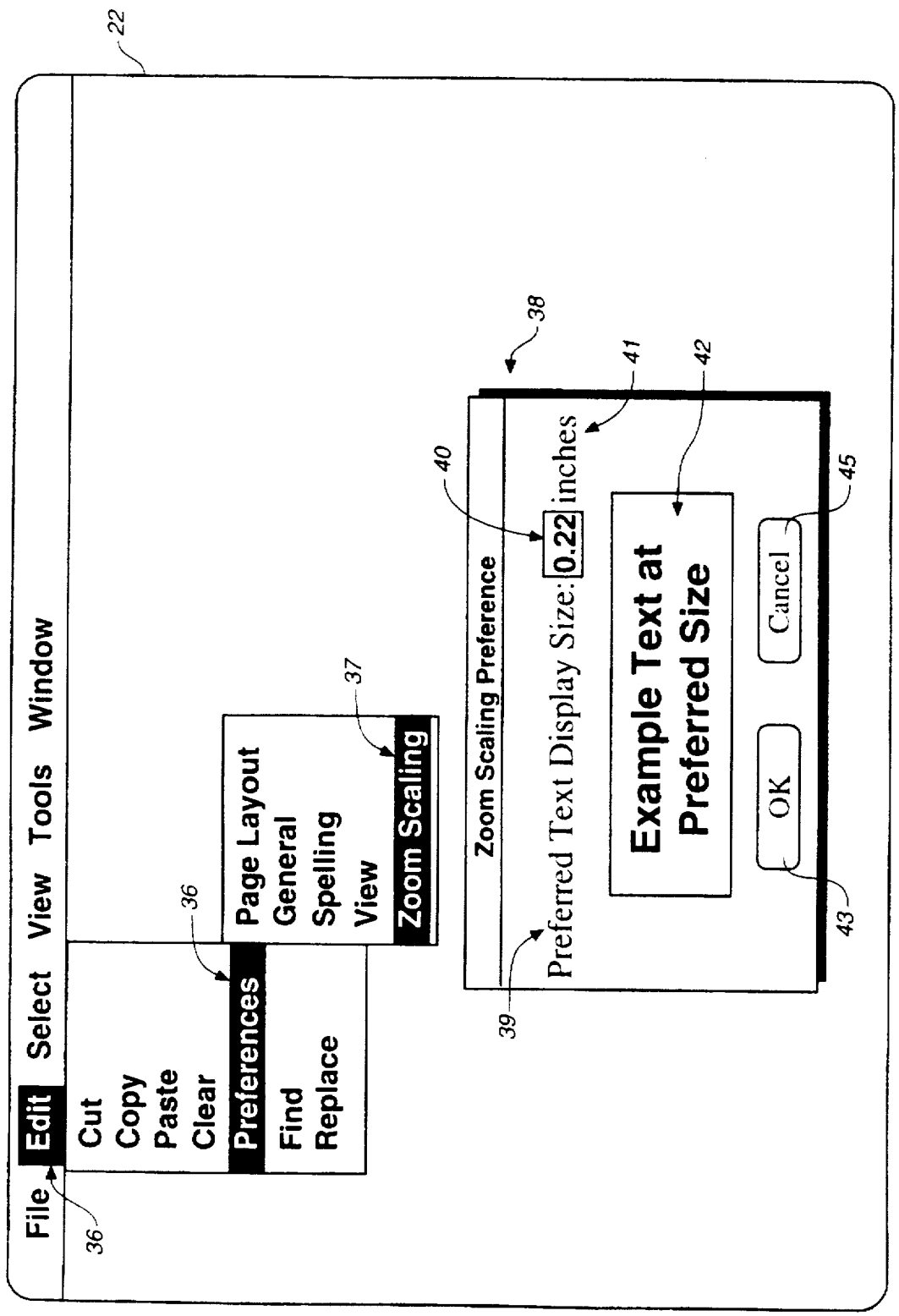
FIG._2

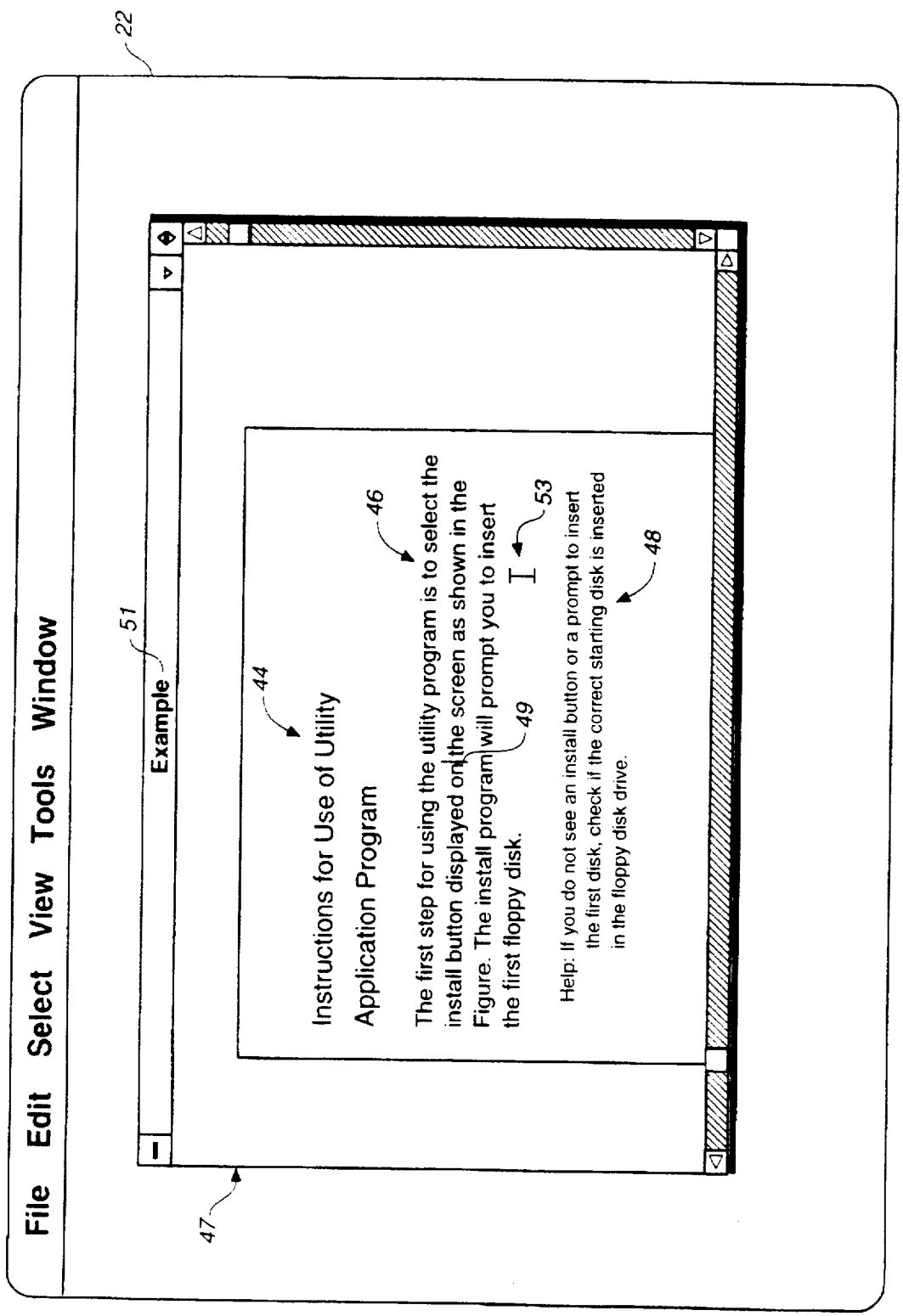
FIG._3A

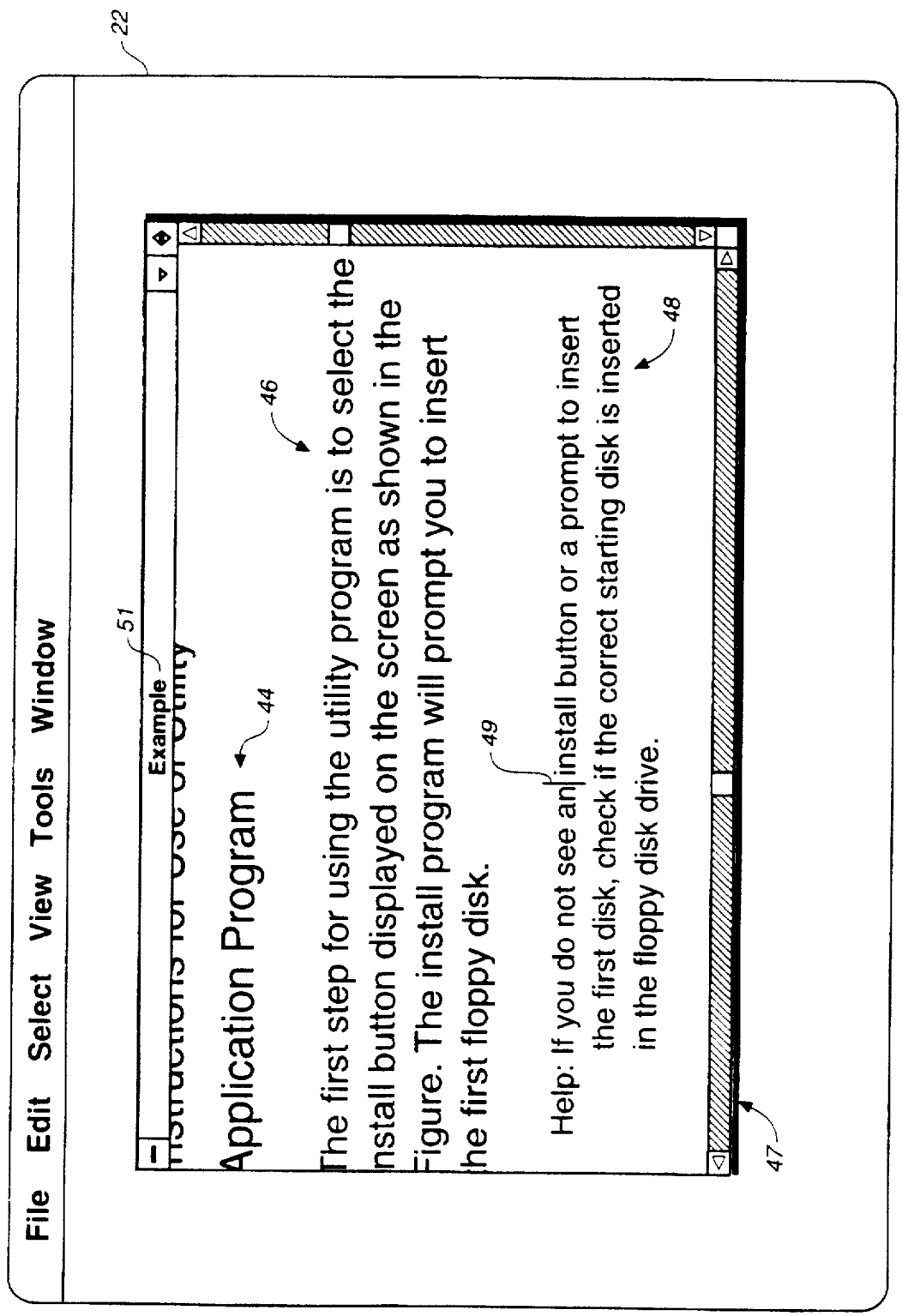
FIG._3B

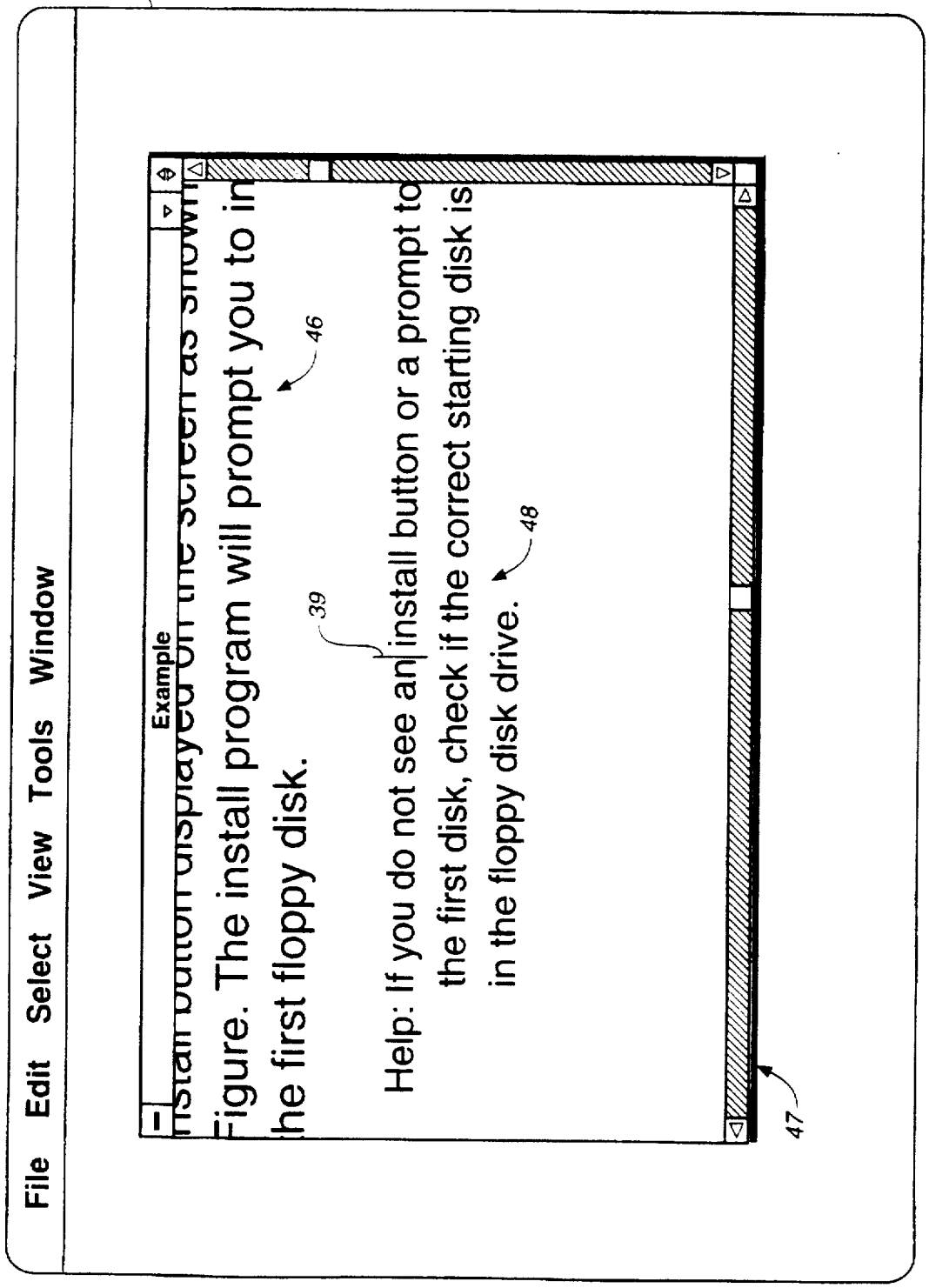
FIG._3C

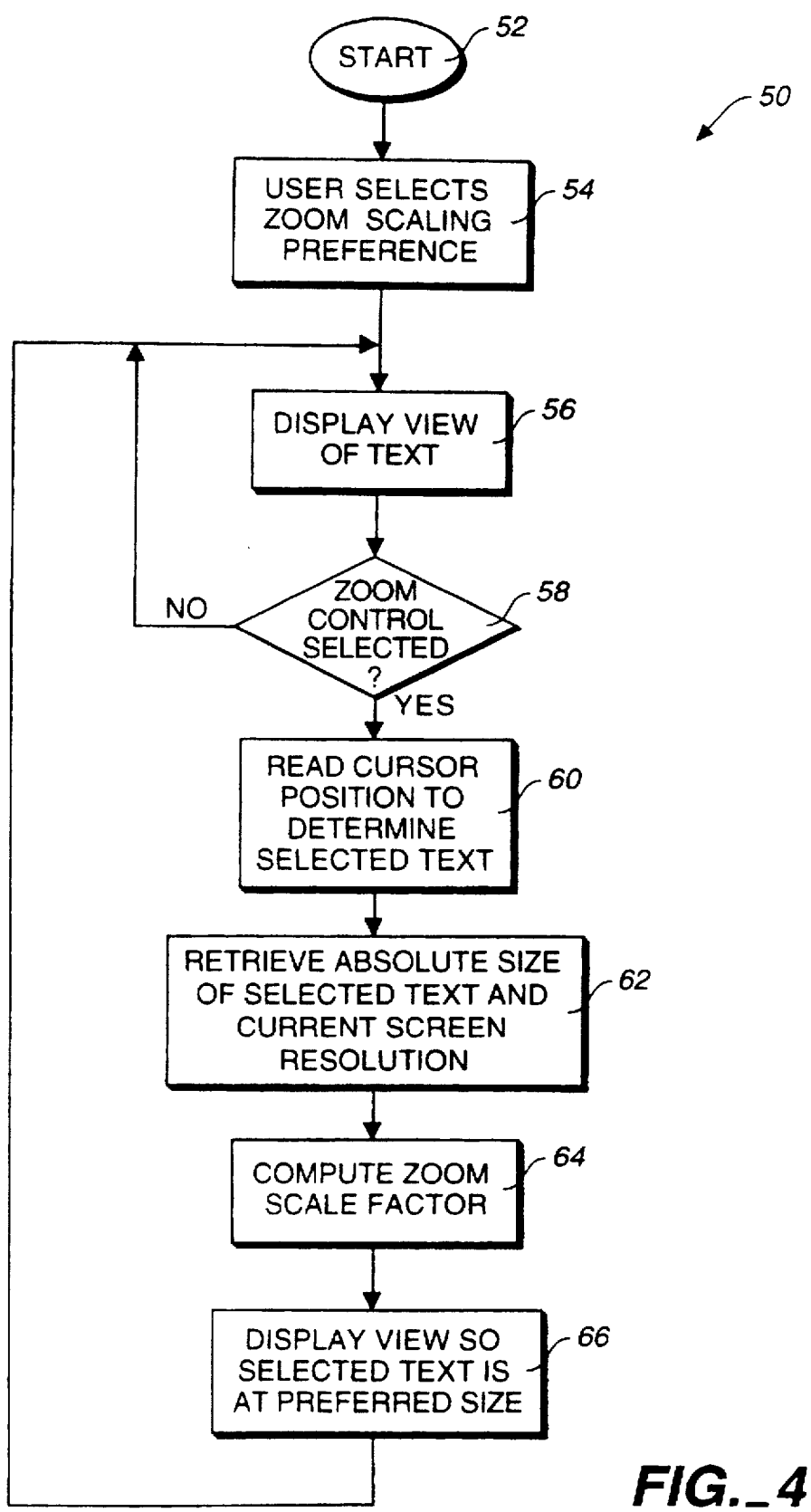
FIG._4

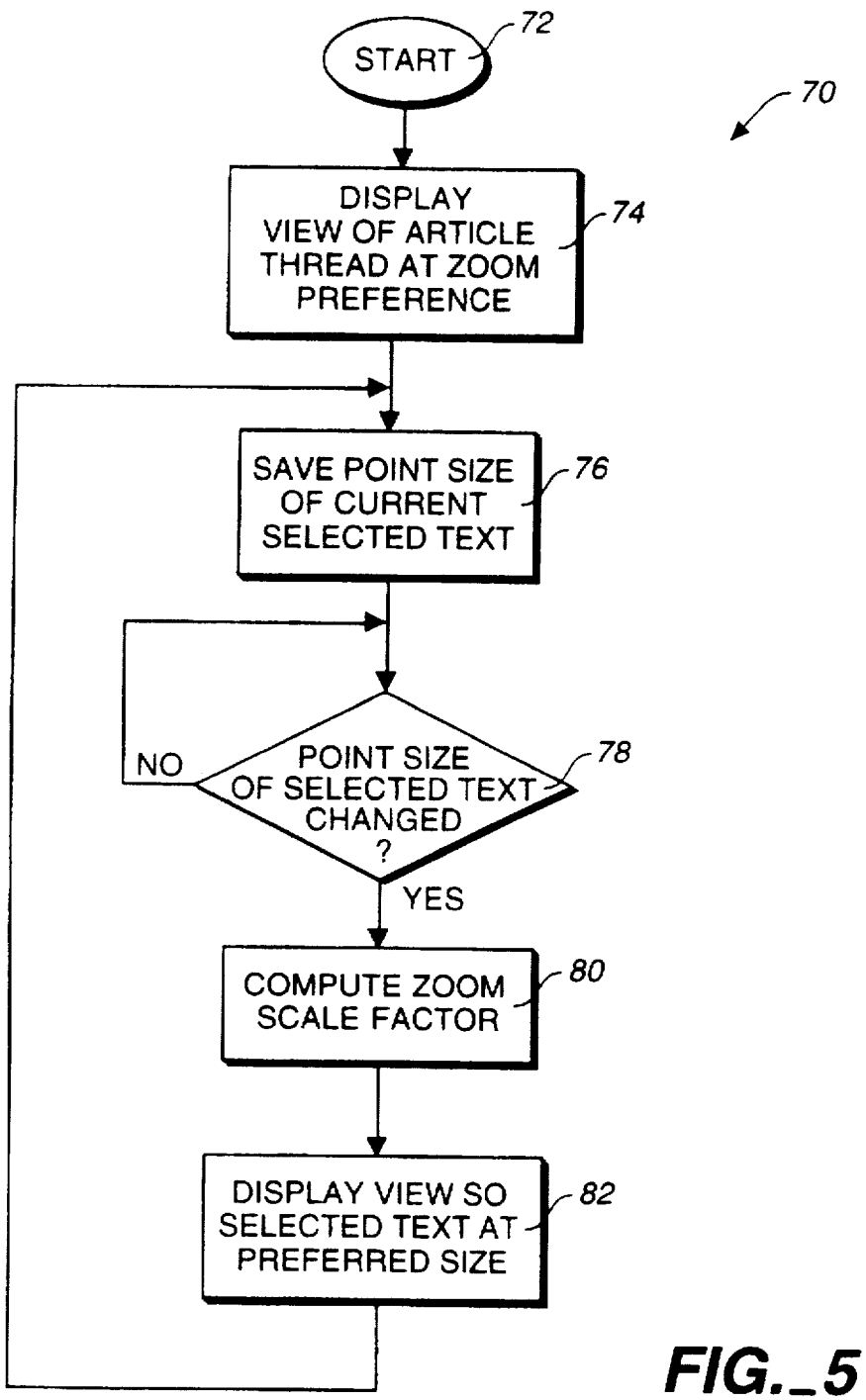
FIG._5

METHOD AND APPARATUS FOR SCALING A SELECTED BLOCK OF TEXT TO A PREFERRED ABSOLUTE TEXT HEIGHT AND SCALING THE REMAINDER OF THE TEXT PROPORTIONATELY

BACKGROUND OF THE INVENTION

The present invention relates generally to the display of digitally stored images, and more particularly to a method and apparatus for displaying images on raster display devices such as computer monitors and printers.

Digital images can be efficiently stored, edited, printed, reproduced, and otherwise manipulated as high level descriptive coded information. "Coded" information is represented by one or more "codes" that are designed to be more concise and to be more readily manipulated in a computing device than data in, for example, bitmap form. For example, characters of text can be stored as ASCII character codes which can be translated by an application program and displayed as images on a raster output device, such as a CRT or LCD display or a laser printer. The application program displays each character of text by "rasterizing" a character code to create a noncoded bitmap and subsequently displaying the bitmap.

A bitmap includes pixels which correspond to display pixels of the output device. A pixel is a fundamental picture element of an image, and a bitmap is a data structure including information concerning each pixel of the image. Bitmaps, if they contain more than on/off pixel information, are often referred to as "pixel maps." When bitmaps are to be created from coded information, a "character outline", for example, can be associated with each character code and a bitmap of a character can be rendered from the character outline and other character information, such as size.

A commonly-used language to render bitmaps from character outlines is the PostScript® language by Adobe Systems, Inc. of Mountain View, Calif., and a standard format for character outlines includes the Type 1 ® format by Adobe Systems, Inc. Alternatively, displayed images can be directly displayed from non-coded data, such as bitmap character representations, rather than coded data. Generally, high level coded digital representations are more compact than primitive non-coded bitmaps.

Many application programs can display images from coded data using a variety of built-in functions. For example, many available word processors have editing functions which can display coded data, such as text, on a display screen according to a variety of preferences. Such preferences include desired page size, displayed window size (i.e., how much text can be displayed at once), font size of the text, displayed margins, and the displayed size of the text. The displayed size of the text is the size of the text as displayed on a display screen, which might be different from the absolute coded size of the text that appears when the text is printed on paper from a printing device. For example, a user may wish to view larger text while editing the text on a display screen, yet may still want to print the text on paper at the stored coded font size. Some application programs that display coded data include a "zoom" function that, when selected, increases or decreases the size of the text on the screen to a desired viewing size. A user can typically specify a desired magnification level or percentage scaling change during the display of text, and the text is then displayed at the desired scale.

A disadvantage that is present in available word processors, spreadsheet programs, presentation programs, and other application programs, is that the user must manually select a zoom preference every time a new document or a new size of text is viewed. For example, the user must select a zoom magnitude by selecting a drop-down menu or similar function and typing in the desired scaling value each time the zoom is to be performed. This can be repetitive and tiresome for the user if many different documents are loaded and viewed on a system, since the preferred zoom size must be selected individually for each document, or if many different sizes of text are included in a single document. In addition, the user may have to iteratively adjust a zoom preference until a preferred displayed text size is achieved, since different text files may have different default text sizes. This also can be inconvenient for the user.

What is needed is a method and apparatus for automatically displaying selected text at a preferred size on a display screen with a quick, simple command from the user. Any document and/or text size displayed by an application program should be displayed at the preferred size, thus allowing the user to view the document easily and without having to provide repetitive selections and preferences.

SUMMARY OF THE INVENTION

The present invention provides a method and apparatus for displaying a raster image having a preferred size. The user enters a preferred display size before text is viewed so that when text is displayed, the user can quickly change selected text to the preferred size. This allows quick and convenient display of text for the user at a preferred display size.

The method and apparatus of the present invention provides a computer system including a display for displaying raster images, preferably text raster images. A preferred display size is input to the computer system by a user and this preferred text display size is stored in memory or on a storage device. Preferably, a preferences window or the like is displayed for the user to enter the preferred size. When text images are displayed on the display screen, a selected section of text is determined, the preferred text size is retrieved, and the displayed text images are scaled by a scale factor such that the selected text section is displayed at the preferred text size.

In one embodiment of the present invention, the text images are displayed in an application program's window. A user selects the selected section of text using a cursor and/or a pointing device, where each text section can have a different displayed size. The user can then provide a scaling command by activating a zoom scaling control, such as a key on a keyboard, a mouse button, an icon, etc. Once the scaling command is received, the computer system calculates the scaling factor from the preferred text size and the absolute size of the selected text, typically stored in the text file from which the text images are derived. All the text sections being displayed are then scaled with the scale factor such that the selected text section is displayed at the preferred text size. The displayed text sections are preferably moved, if necessary, so that the cursor is displayed at about the center of the application window.

In another embodiment of the present invention, text images are initially displayed on the display screen, where a selected text section has the user's preferred size. The "selected" text section is initially considered to be the first section of text displayed. The selected text section can change, for example, when the user displays different text sections. Preferably, the selected text section is the text section covering the greatest area of the application window or display. If the selected text section changes to a new text section, then a new scale factor is automatically calculated using the preferred text size and the absolute point size of the new selected text section. The view is then automatically scaled using the new scale factor so that the new selected text is displayed at the preferred text size. This embodiment is suitable for displaying article threads or other linked text documents having many separate pages and sizes of text sections.

An advantage of the present invention is that the user need only enter a preferred display size for text and other raster images once, since the preferred display size is stored. The preferred size can be retrieved and applied to different sections and files of text, allowing a user to quickly and easily change displayed text to a comfortable reading size with a single command. Another embodiment of the present invention provides automatic scaling of displayed text to the stored preferred size as the user moves through a text document, even if different text sizes are presented in the document.

These and other advantages of the present invention will become apparent to those skilled in the art upon a reading of the following specification of the invention and a study of the several figures of the drawing.

BRIEF DESCRIPTION OF THE DRAWINGS

FIG. 1 is a block diagram of a computer system in accordance with the present invention;

FIG. 2 is a diagrammatic illustration of a display screen showing the preferences window of the present invention;

FIG. 3a is a diagrammatic illustration of the display screen showing a text window for use in the present invention;

FIG. 3b is a diagrammatic illustration of the display screen showing the text window of FIG. 3a after the view has been scaled so that the selected text section is displayed at a preferred size;

FIG. 3c is a diagrammatic illustration of the display screen showing the text window of FIG. 3b after the view has been scaled so that a different text section is displayed at a preferred size;

FIG. 4 is a flow diagram illustrating a first embodiment of the present invention for displaying selected text at a preferred size; and FIG. 5 is a flow diagram illustrating a second embodiment of the present invention for displaying selected text at a preferred size.

DETAILED DESCRIPTION OF THE PREFERRED EMBODIMENT

The present invention is well-suited for presenting text to a user on a display screen or other output device. The present invention can be implemented on a variety of types of computer systems, including personal computer systems, portable computer systems, pen-based computer systems, mainframe computer systems, voice-based computer systems, etc.

A number of terms are used herein to describe images and related structures. "Pixel" refers to a single picture element of an image. Taken collectively, the pixels form the image. "Bitmap" refers to bits stored in digital memory in a data structure that represents the pixels. As used herein, "bitmap" can refer to both a data structure for outputting black and white pixels, where each pixel either is on or off, as well as a "pixel map" having more information for each pixel, such as for color or gray scale pixels. "Raster" refers to the arrangement of pixels on an output device that creates an image by displaying an array of pixels arranged in rows and columns. Raster output devices include laser printers, computer displays, video displays, LCD displays, etc., which display raster images. "Coded" data is represented by a "code" that is designed to be more concise and to be more readily manipulated in a computing device than raw data, in, for example, bitmap form. For example, the lowercase letter "a" can be represented as coded data, e.g., the number 97 in ASCII encoding. Type 1 PostScript® format from Adobe Systems, Inc., can also be used for coding data.

In FIG. 1, a computer system 10 for displaying text includes a digital computer 11, a display screen 22, a printer 24, a floppy disk drive 26, a hard disk drive 28, a network interface 30, and a keyboard 34. Digital computer 11 includes a microprocessor 12, a memory bus 14, random access memory (RAM) 16, read only memory (ROM) 18, a peripheral bus 20, and a keyboard controller 32. Digital computer 11 can be a personal computer (such as an IBM-PC AT-compatible personal computer), a workstation (such as SUN or Hewlett-Packard workstation), a pen-based computer system, etc.

Microprocessor 12 is a general purpose digital processor which controls the operation of computer system 10. Microprocessor 12 can be a single-chip processor or can be implemented with multiple components. Using instructions retrieved from memory, microprocessor 12 controls the reception and manipulation of input data and the output and display of data on output devices. In the described embodiment, a function of microprocessor 12 is to display raster images on display screen 22 derived from, for example, coded text data stored in a text file. The text file can be stored on a storage device, such as a hard disk or floppy disk, or it can be stored in RAM, be provided over a network, etc. A function of microprocessor 12 in the present invention is to read a preferred size for a selected portion of a displayed raster image and to scale a displayed image so that the selected portion is displayed at the preferred size.

Memory bus 14 is used by microprocessor 12 to access RAM 16 and ROM 18. RAM 16 is used by microprocessor 12 as a general storage area and as scratch-pad memory, and can also be used to store input data and processed data. ROM 18 can be used to store instructions followed by microprocessor 12 as well as character outlines used to display images in a specific format. For example, input data from a file can be in the form of character codes representing characters in a format such as ASCII, a portable electronic document language such as the Portable Document Format™ (PDF™), or a page description language such as PostScript®. The characters' associated character outlines can be retrieved from ROM 18 when bitmaps of the characters are rendered to be displayed as rendered images by a raster output device. Alternatively, ROM 18 can be included in an output device, such as printer 24.

Peripheral bus 20 is used to access the input, output, and storage devices used by digital computer 11. In the described embodiment, these devices include display screen 22, printer device 24, floppy disk drive 26, hard disk drive 28, and network interface 30. Keyboard controller 32 is used to receive input from keyboard 34 and send decoded symbols for each pressed key to microprocessor 12 over bus 33. Keyboard controller 32 (or a different controller) can also be used to receive input from a mouse 35 or similar pointing device and provide the input to microprocessor 12.

Display screen 22 is an output device that displays images of data provided by microprocessor 12 via peripheral bus 20 or provided by other components in the computer system. In the described embodiment, display screen 22 is a raster device which displays images on a screen corresponding to bits of a bitmap in rows and columns of pixels. That is, a bitmap can be input to the display screen 22 and the bits of the bitmap can be displayed as pixels. An input bitmap can be directly displayed on the display screen, or components of computer system 10 can first rasterize codes or other image descriptions from a page description file into bitmaps and send those bitmaps to be displayed on display screen 22. Raster display screens such as CRT's, LCD displays, etc. are suitable for the present invention.

Printer device 24 provides an image of a bitmap on a sheet of paper or a similar surface. Printer 24 can be a laser printer, which, like display screen 22, is a raster device that displays pixels derived from bitmaps. Printer device 24 can print images derived from coded data such as found in a page description language or portable electronic document. Other output devices can be used as printer device 24, such as a plotter, typesetter, etc.

To display images on an output device, such as display screen 22 or printer 24, computer system 10 can implement one or more types of procedures. One procedure is to transform coded objects into coded image descriptions, which instructs the microprocessor in creating non-coded objects such as bitmaps. For example, an image description for a text character code can include associated information which specify how the character is to be displayed, such as positional coordinates, size, font, etc. A well known portable electronic document language for specifying image descriptions is the Portable Document Format (PDF) language by Adobe Systems, Inc. of Mountain View, Calif., which is used in the Acrobat™ application program. The image description can reference stored character outlines which describe the shape of the character and includes other rasterizing information. A well-known character outline format is the Type 1® format, by Adobe Systems. Using character outlines, computer system 10 can rasterize and display a bitmap for each coded character.

Floppy disk drive 26 and hard disk drive 28 can be used to store text files of coded data, bitmaps, image descriptions, and character outlines, as well as other types of data. Floppy disk drive 26 facilitates transporting such data to other computer systems, and hard disk drive 28 permits fast access to large amounts of stored data such as bitmaps, which tend to require large amounts of storage space. Other mass storage units such as nonvolatile memory (e.g., flash memory), PC-data cards, or the like, can also be used to store data used by computer system 10.

Network interface 30 is used to send and receive data over a network connected to other computer systems. An interface card or similar device and appropriate software implemented by microprocessor 12 can be used to connect computer system 10 to an existing network and transfer data according to standard protocols.

Keyboard 34 is used by a user to input commands and other instructions to computer system 10. Images displayed on display screen 22 or accessible to computer system 10 can be edited, searched, or otherwise manipulated by the user by inputting instructions on keyboard 34. Mouse 35 is also preferably used with computer system 10 to manipulate a pointer on display screen 22. Other types of user input devices can also be used in conjunction with the present invention, such as a track ball, a stylus, or a tablet, as is well-known to those skilled in the art.

FIG. 2 is a diagrammatic illustration of display screen 22 displaying an example of a preferences screen for the present invention. In the described embodiment, computer system 10 implements a graphical user interface (GUI) which provides the user with graphical controls such as menus, icons, etc., as is well known to those skilled in the art. The user preferably selects the preferences window of the present invention through standard menu items 36. Preference selections from a menu are common in application programs such as word processors, spreadsheets, and drawing programs. The user preferably picks a "zoom scaling preference" option 37 of the present invention, which can be presented in a menu list as shown in FIG. 2, or can be presented in a separate window or dialog box (not shown).

Preferences window 38 is displayed in response to selecting the scaling preference option 37. Window 38 is preferably a separately displayed window, dialog box, screen, etc. A scaling prompt 39 informs the user that a preferred displayed text size is to be entered. A user can enter a number (or other indication of magnitude in other embodiments) in entry field 40 indicative of the preferred size using, for example, keyboard 34. This number is the magnitude of the preferred size as defined by measurement units 41, which are displayed near entry field 40. In the preferred embodiment, these units are inches; in alternate embodiments, different measurement units can be used, or the user may be allowed to change the preferred measurement units to centimeters, points, etc. If the measurement units are points, then the number entered in entry field 40 indicates the preferred point size of text, such as 12-point, 14-point, etc. If the measurement units are inches or an equivalent measure of length, then the magnitude in entry field 40 preferably indicates the preferred maximum character height in a specified font. For example, a magnitude of 0.25 inches indicates that the height from the lowest possible point of characters in a font to the highest possible point of characters in that font is 0.25 inches. Alternatively, the user can be prompted to enter the average character whose magnitude is to be specified, as well as the font of that average character.

In the preferred embodiment, a displayed text example 42 having the preferred text size specified in entry field 40 is displayed below prompt 39 in the preferences window 38. The text example 42 can be shown in a default or user-specified font. The user can conveniently view the text example to determine if the text size specified in entry field 40 is the desired size.

Once the preferred size has been entered in entry field 40, the user closes preferences window 38 by selecting "OK" button 43 or equivalent control. The preferred size is then stored by microprocessor 12 in RAM or on a storage device such as hard disk 28. The "cancel" button 45 can be selected if the user does not wish to save the entered size in field 40. The user only has to enter the preferred size once; text can be displayed at this preferred size according to the method described below without re-inputting the preferred size. Preferences window 38 can be accessed again by the user if he or she wishes to change the magnitude of the preferred size.

FIG. 3a is a diagrammatic illustration of display screen 22 showing text raster images. Text sections 44, 46 and 48 are displayed from a coded text file named "Example" in an application window 47 which is displayed by an application program running on computer system 10. Herein, the term "text" refers to any characters, symbols, or other images which can be stored as codes in a format such as ASCII or PostScript. A "text section" or "section of text" refers to a portion of the text displayed in window 47 or on display 22 having characters, symbols, etc. that have a uniform size, such as 12 points. A text section can also be referred to as a subset of the text shown in window 47. In FIG. 3a, text section 44 is displayed at one size, text section 46 is displayed at a second size, and text section 48 is displayed at a third size. For example, text section 44 can be 16-point text, text section 46 can be 12-point text, and text section 48 can be 8-point text.

The application program in the example of FIG. 3a is a word processor that displays text from codes stored in a text file. Such codes are typically in a standardized format or language, such as ASCII or PostScript. A wide variety of application programs can display text in a similar manner, including spreadsheet programs, drawing programs, desktop publishing programs, presentation programs, etc. As shown in FIG. 3a, text sections 44, 46 and 48 can be displayed on the display screen 22 within an application window 47, which is a window displayed by an application program for displaying data, as implemented in many graphical user interfaces. Text and other images can be displayed in one or more windows, and the windows can be moved around on display screen 22, adjusted in size, etc. The name 51 ("Example") of the text file from which the text is retrieved can be displayed at the top of the application window 43. Alternatively, text section 44, 46 and 48 can be displayed directly on display screen 22 without using any application windows.

Text sections 44, 46 and 48 can be displayed on screen 22 in a size that corresponds to the printed size of the text when it is printed by a printing device. For example, 12-point text can displayed on screen 22 as close as possible to the stored, absolute 12-point size of the letters as printed on a page. This can provide the user with a realistic presentation of the page so that the user can easily determine how the page will look when printed. Alternatively, text sections 44, 46, and 48 can be displayed in window 47 having sizes much different from the absolute size of the text. In other embodiments, text is initially displayed (i.e. displayed when the document is first "opened" and displayed) on screen 22 in a default size that may not correspond to the actual printed size but which is standard to the application program.

It is sometimes the case that the absolute size, default displayed size, or current displayed size of the text is an inconvenient size when viewing the text on the screen. A user may not want to view a display screen to read relatively small text as closely as he or she would when reading text on a piece of paper. The present invention therefore provides the user with a simple and convenient method to change displayed, selected text to a preferred size.

When text file "Example" is first opened by the application program, the first text on the displayed page is preferably displayed at the preferred text size specified in entry field 40 of the preferences window 38, as shown in FIG. 2. Thus, text section 44 is preferably displayed at the preferred text size (0.22 inches in the example). The process of scaling text to the preferred text size is described below. In alternate embodiments, the text from text file 51 can be initially displayed in a default text size specified by the application program displaying the text.

In FIG. 3a, text section 46 has been determined by the user to be displayed at an inconvenient or otherwise undesired size. The user would like to view the text section at a comfortable size that he or she knows is easy to read. According to the method of the present invention, the user moves a cursor 49 to the text section which he or she wishes to view at a preferred size. By moving cursor 49 onto text section 46, the user has "selected" that text section for purposes of the present invention. Cursor 49, as shown in FIG. 3a, is a standard "edit" cursor for indicating where a next character will be inserted in the text if the user chooses to do so. Preferably, a graphical pointer 53 can be moved around screen 22 by the user manipulating a mouse, trackball, stylus, or other input pointing device. Pointer 53 can be used to move cursor 49 can to a different location by moving pointer 53 to the new location and selecting a mouse button or similar control, as is well known to those skilled in the art. In other embodiments, cursor 49 can be appear differently; for example, rectangular or other types of cursors can be used. Also, cursor 49 can be controlled by other input devices. For example, when using a keyboard computer system, a user can move cursor 49 from character to character of text section 46 using arrow keys or other keys on the keyboard. Or, when using a stylus-based computer system having a dual-function display screen/input tablet, a user can simply point to the desired text with a stylus to select it.

In alternate embodiments, a text section can be selected in other ways. For example, pointer 53 or cursor 49 can be moved to highlight or mark an entire section of text, as is well known in word processing and other application programs. A user can also highlight just a word or character of text. A section of text, character, or word that is highlighted is typically marked in some fashion, such as with a differently-colored box around the selected section, word or character. Also, the text section that a highlighted word belongs to can be considered selected for purposes of the present invention (selecting a word in a section of text and selecting an entire section of text has the same effect in the present invention, as described below).

After a text section has been selected, the user then activates a zoom scaling control to send a zoom scaling command. Such a control can be implemented in a variety of ways. For example, a button on a mouse can be activated. Or, a key or key combination on a keyboard can be pressed, a button on a stylus can be activated, an icon or other "soft" button displayed on the screen can be selected, a voice command can be input to a microphone, etc. The zoom scaling command causes the view of window 47 to be scaled so that the text section selected by cursor 49 is displayed at a preferred size, as described below with respect to FIG. 3b. Alternatively, in embodiments utilizing a stylus and tablet, a zoom control "gesture" can be input by the user with the stylus. For example, the user write a particular gesture shape, such as a spiral, arrow, "x", etc., with a stylus over a selected section of text. The gesture is recognized by recognition software and interpreted as a zoom scaling command to scale the view so that the selected text is displayed at the preferred size. Alternatively, the user can first select text with a stylus, such as with the highlighting method mentioned above, and then write a particular gesture anywhere on display screen 22 or in a designated area of the display screen.

In alternate embodiments, other raster images besides text can be displayed at a preferred size. For example, standardized graphical images such as architectural symbols, electrical schematic symbols and diagrams, mathematical symbols, icons, etc., can be displayed at a preferred size. A preferred size for such symbols and other indicia can be input in a preferences screen by the user similar to the screen shown in FIG. 2.

FIG. 3b is a diagrammatic illustration of display screen 22 in which the view of window 47 has been scaled such that text section 46 selected by the user is displayed at a preferred size. As shown in the Figure, text section 46 has been increased in size to the preferred size (0.22 inches in this example) after the user has selected the zoom scaling control. Text sections 44 and 48 have also been increased in size by the same scaling factor by which text 46 has been increased; this is because the entire "view" of the text has been changed, not the coded absolute text size. The area within window 47 for displaying text is referred to herein as the "view" of the window. The method of the present invention only increases the displayed size of text within the view of window 47, not the absolute size of the text. Text sections 44, 46 and 48 can thus still be printed on a printing device at the original absolute size that is stored in the text file. Preferably, the display screen scales the selected text at the preferred size with cursor 49 centered in application window 47 (shown in FIG. 3c). In other embodiments where text is not displayed within a window, the selected text is preferably shown at the preferred size with the cursor 49 centered on the display screen 22.

The microprocessor knows the preferred text size of the user from the previously-entered magnitude entered in entry field 40 of preferences window 38. Since the step of entering the preferred text size is performed prior to the user viewing the document, the user does not have to enter a new scale preference every time he or she wishes to alter the displayed size of text. It is this feature that allows the present invention to provide a convenient and quick method for a user to view text at a preferred size.

FIG. 3b also shows cursor 49 that has been moved to text section 48. The user can select the zoom scaling control again to cause the view to display text 48 at the preferred size, as shown in FIG. 3c.

FIG. 3c is a diagrammatic illustration of display screen 22 showing text 48 displayed at the preferred size of the user (0.22 inches in the example). Similar to FIG. 3b, the view of text sections 46 and 48 has been "zoomed in", i.e., the text sections 46 and 48 appear larger in FIG. 3c than in FIG. 3b. Text section 44 is not displayed, since it is positioned too far above text 46 to be seen in window 47. Cursor 49 (and the word 46 selected by cursor 49) is shown centered in window 47.

FIG. 4 is a flow diagram 50 illustrating the method of the present invention of displaying a raster image at a preferred size. The method begins at 52, and, in step 54, the user selects a zoom scaling preference. This is preferably done with a preferences option that is supplied with an application program, an example of which is shown above in FIG. 2. The preference can be selected using an application program's standard method for selecting preferences, such as in preferences window 38. For example, preferences might typically be selected by making a selection from a drop-down menu. Preferences typically include default fonts, hidden text options, measurement units, spelling checker options, etc. Drawing programs and other application programs also typically have a preferences menu and options. The zoom scaling preference of the present invention can be included with these other preferences.

The magnitude of the preferred size is entered as a number in entry field 40 using keyboard 34 in the example of FIG. 2. Alternatively, the user can input the number using a pointing device and menu, arrows to increment or decrement the magnitude, etc. In other embodiments, the scaling preference can be selected using a graphical control, such as a slider bar or dial, or a voice command. The inputted preferred size can be stored in RAM 16 (which can have a battery backup, for example, to provide non-volatile storage) or on a more permanent storage device, such as hard disk 28.

Step 54 is preferably performed at the user's leisure, such as when setting up other preferences for an application program, initially running the application program, installing the program, etc. The user's zoom scaling preference will thus be already inputted when the user wishes to change displayed text to the preferred size at a later time.

In step 56, a "view" of text is displayed in window 47 as shown in FIG. 3a for the user to view. As explained above, the area within window 47 that displays text is referred to herein as the "view" of the window. If no window is being implemented, then the view is the entire area of display screen 22 or the portion of the display screen used for displaying text or other data images. For example, the user can be reading a text document displayed in window 47 and scrolling through the document. Or, the user can edit the displayed text document by inputting new text, deleting text, combining two text files, etc.

Alternatively, the initial view displayed by window 47 can be scaled to the preferred size of the user, as described below with reference to steps 62–66. The "selected" text in this step can be the first text of the text file, or the first text that is displayed.

Text can be displayed from codes stored in a text file, as is well-known to those skilled in the art. For example, the text codes can be rasterized into bitmaps which are then displayed on display screen 22, as described above. Other information is also typically stored with the text codes in the text file, such as absolute size, font, margins, etc., as described below.

In step 58, the microprocessor 12 checks if the zoom scaling control has been selected, which indicates that the user has issued a scaling command to scale the view so that the selected text is displayed at the preferred size. As described with reference to FIG. 3a, the zoom scaling control can be implemented as a key(s) on a keyboard, a button on a pointing device, a menu command, an icon displayed on screen 22, etc. When the user activates the scaling control, the microprocessor preferably receives a signal, through peripheral bus 20, keyboard controller 32, memory bus 14, or similar components. If the microprocessor does not detect that the zoom scaling control is being selected, the process returns to step 56, in which text regions continue to be displayed for the user according to functions of the displaying application program.

If the microprocessor does detect that the zoom scaling control has been selected in step 58, then step 60 is implemented, in which the microprocessor 12 reads the position of cursor 49 on the display screen 22 to determine the selected text. The position of cursor 49 can be specified as an offset in characters from the beginning of the file, or alternatively, can be specified in rectangular (x, y) coordinates. Once the cursor's position is located, the microprocessor determines that the text section in which the cursor is located is the selected text section. Since "borders" between text sections are typically indicated by a change in displaying information (point size, font, and other characteristics) that is stored directly before the text in the file, the cursor can be included in the section of text specified by the most current displaying information. If, for some reason, cursor 49 is not included in any text section, a zoom scaling command can be ignored.

Alternatively, if pointer 53 (shown in FIG. 3a) is used to select text, then the microprocessor can determine which text section is being displayed at the pointer 53 position. For example, the microprocessor can check if the pointer's current location is within a section of text displayed on the screen. The microprocessor can check the coordinates of the pointer 53 and compare these coordinates to text section coordinates. If the pointer 53 is not touching any text (or other graphically displayed object) within a predetermined distance threshold, for example, then the microprocessor can assume that no text was selected and ignores the zoom scaling command.

In step 62, the absolute size of the selected text is retrieved. As referred to herein, the "absolute" size of the text section is a coded point size of the section that is stored in the same file where the text section is stored. As mentioned above, text displaying application programs typically read displaying information about a section of text that is stored in the text file. Such displaying information typically includes point size, font, italic or boldface indicators, justification, line spacing, paragraph spacing, and so on. The absolute size of a section of text can thus be directly retrieved from the associated text file, or it may already be present in memory, such as RAM 16, (i.e., loaded when the text section was first displayed). The absolute size is a standard measure of the size of the text, typically in points, and determines how large the text will appear when printed on paper from a printing device; some application programs may use a different unit of measure.

Also in step 62, the current screen pixel resolution is retrieved. As explained above, raster output devices, such as display screen 22, include rows and columns of pixels. The resolution of the screen pixels can be specified as pixels per inch. Such a measure is useful in calculating the display size of text for the user, as detailed below. The current screen resolution can typically be found by generating a system call to the operating system, as is well known to those skilled in the art.

In step 64, the microprocessor computes the zoom scale factor for the selected text. This is preferably accomplished by first converting the absolute size of the selected text to the measurement units 41 used for the preferred size as shown in preferences window 38. For example, assuming that the user entered a preferred text size in inches and the absolute size is in points, the absolute size can be converted to inches using the standard conversion of 1 point=1/72 inch. Next, the preferred text size is then retrieved from the storage device where preferences are stored, and the zoom scale factor is calculated as a ratio of the preferred size to the absolute size of the selected text. The zoom scale factor represents how much the absolute size of each displayed text section is scaled so that the selected text will be displayed at the preferred size. For example, the absolute size of selected text might be 0.139 inches (10 points), and the preferred size is 0.22 inches (16 points). The scale factor is thus 1.6, i.e., the preferred text size is 1.6 times greater in size than the absolute size of the selected text.

In next step 66, the microprocessor displays the view of window 47 so that the selected text is at the preferred size. This is accomplished by multiplying the scale factor calculated in step 64 by the converted stored size for all sections of text displayed in window 47 to create scaled sizes for each text section. Then, the scaled sizes are adjusted so that the text will appear the correct size according to the screen resolution. This is preferably accomplished by multiplying the scaled size of each text section by the current screen resolution to achieve a pixel size measure. For example, a scaled size of 0.22 inches is multiplied by a screen resolution of 72 pixels per inch, resulting in a pixel measure of 16 pixels. The application program thus knows that the text characters are displayed with a height of 16 pixels.

The scaling of all the displayed text sections causes the entire view of window 47 to be scaled such that the selected text is at the preferred size; this causes text at other sizes within the view of window 47 to change size also. For example, text section 46 is increased from a displayed size of 0.139 inches to a preferred size of 0.22 inches in FIGS. 3a and 3b (scale factor=1.33). Text sections 44 and 48 are thus also increased by a factor of 1.33. Preferably, the view is displayed such that the position of cursor 49, and thus the portion of the selected text covered by cursor 49, is positioned at the middle of the view, as shown with respect to FIG. 3c. The process then returns to step 56 to display the text region according to other user commands and functions of the application program. When the user exits the application program, closes window 47 or otherwise removes the display of the text from the screen, the process is complete. At a later time when the text is displayed, the process begins with step 56 instead of step 54, since the zoom scaling preference has already been entered (unless the user wishes to change the zoom scaling preference).

FIG. 5 is a flow diagram illustrating an alternate method 70 of the present invention in which a user is moving through a text document or an "article thread." A text document typically includes too much text to be viewed at once on the display screen or in window 47, so that the user must move through the document to read the text by "scrolling"(moving) the text from the bottom of the screen, display one page at a time, etc. An article thread is a series of documents or portions of documents that are sequentially linked together by pointers or the like. Thus, when a user finishes one section of the article thread, the next portion in the thread is automatically loaded regardless of how disjointed the different articles may be when viewed as whole, such as in a newspaper format. One example of implementing article threads is described in co-pending patent application Ser. No. 08/304,680 by Warnock et al., entitled, "Method and Apparatus for Viewing Electronic Documents", assigned to assignee of the present invention and which is hereby incorporated by reference herein.

The process begins at 72, and, in step 74, a view showing a portion of the article thread (or text document) is displayed automatically at the zoom scaling preference in window 47 or elsewhere on display screen 22. For example, when a user first "opens" an article thread so that the first page is displayed in window 47, the beginning text section on this page is automatically scaled to the preferred display size, which was previously entered by the user in a preferences prompt as described in step 54 of FIG. 4. This beginning text section can thus be considered the "selected" text for this embodiment. In next step 76, the stored point size of the current selected text is saved, i.e. the stored point size is kept for later use. This stored point size is retrieved from the text file (or from memory) for the text section that is currently being displayed at the preferred size and is saved.

In step 77, a view of the article thread (or document) is displayed appropriate to the manipulations of the user. For example, the user can cause the next page of the article thread or document to be displayed, edit displayed text, etc. In step 78, the microprocessor checks if the absolute size of the currently selected text section has changed. This can occur, for example, when the user scrolls down the currently displayed page and a new text section of a different size is displayed in window 47. The point size can also change if a new page or portion of the article thread is selected by the user to be displayed, and the new page or portion has a new size of text. In the described embodiment of FIG. 5, the "selected text" is considered to be the text section that covers the greatest area of window 47 (or display screen 22). The microprocessor can determine this by checking the size of each different text section displayed in window 47, combining any separated text sections that have the same size, and determining which text section covers the greatest area of window 47. The text section (or multiple text sections having the same size) that covers the greatest area of window 47 is thus considered the "selected" text section. If no text section covers a greater area than any other text section, then the selected text section can be considered the text section that is closest to the center area of the view of window 47. In alternate embodiments, the selected text section can always be considered the text section closest to the center of window 47. Alternatively, the selected text section can be considered a text section in a different designated area of the window 47 or display screen 22, as at the top or bottom of the window 47. Note that the user does not have to actively select any text section; the "selected" text section is determined automatically.

If the absolute size of the selected text region has not changed, then the process returns to step 77 to display a view of the article thread as the user manipulates the article thread as desired. When the absolute size of the selected text section has changed, then step 80 is implemented, in which a zoom scaling factor is calculated based on the absolute size of the selected text section and the preferred zoom size of the user. The zoom scaling factor is calculated similarly to the zoom scaling factor calculated in step 64 of FIG. 4. In next step 82, the entire view (as determined above) is scaled with the zoom scaling factor and with the current screen resolution to display the selected text section at the preferred size. This is calculated similarly to step 66 of FIG. 4. Once the displayed portion is at the preferred size, the process returns to step 76 to save the point size of the current displayed portion, as described above, so that it can be compared to other displayed portions in step 78.

The process of FIG. 5 thus provides an automatic scaling of viewed text to a preferred size of the user. The text is scaled automatically to this preferred size, even as the user moves through an article thread or text document and causes different sizes of text to be displayed on screen 22. The preferred size is conveniently entered only once by the user before displaying any text so that all documents displayed thereafter will be shown at the preferred size.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A computer system for scaling a raster image, the system comprising:

a digital processing apparatus;

a display coupled to said digital processing apparatus for displaying a raster image including text;

a means for retrieving a preferred absolute text height stored by the digital processing apparatus;

a means for selecting a block of text to adjust to the selected preferred absolute text height; and means for adjusting the entire raster image by an amount which adjusts the selected block of text to the preferred absolute text height and for adjusting the height of the text in the remainder of the raster image proportionately by the same amount.

2. A computer system as recited in claim 1 wherein the means for selecting a block of text includes a user-controlled cursor.

3. A computer system as recited in claim 2 wherein a position of said user-controlled cursor is controlled by a pointing device.

4. A method for displaying a preferred size of text on a display device of a computer system, the method comprising:

displaying text having a plurality of heights on a display device;

selecting a subset of the displayed text, all of which has a single text height;

retrieving a different preferred text height stored by the computer system for the selected subset of text;

adjusting the height of all displayed text including the selected subset and the remainder of displayed text by a ratio between the different preferred text height and the single text height; and re-displaying the text on the display device at the adjusted height.

5. A method as recited in claim 4 wherein the step of selecting a subset of the displayed text includes the use of a cursor controlled by a user.

6. A method as recited in claim 4 wherein said preferred text height is retrieved from a storage device.

7. A method as recited in claim 6 further comprising a step of prompting a user to input said preferred text height, and storing said input text height on said storage device.

8. A method as recited in claim 7 wherein said step of prompting said user includes displaying a preferences window for a user to input said preferred text height.

9. A method as recited in claim 8 wherein said step of displaying a preferences window includes displaying example text in said preferences window corresponding to said preferred text height input by said user.

10. A method as recited in claim 5 wherein said step of adjusting the height of said text is performed when a scaling command is received.

* * * * *